May 22, 1962   J. G. NOBLE   3,035,565
COPYING DEVICES

Filed Nov. 15, 1960   4 Sheets-Sheet 1

INVENTOR
JOHN GODFREY NOBLE

BY
Watson, Cole, Grindle + Watson
ATTORNEYS

May 22, 1962  J. G. NOBLE  3,035,565
COPYING DEVICES
Filed Nov. 15, 1960  4 Sheets-Sheet 2
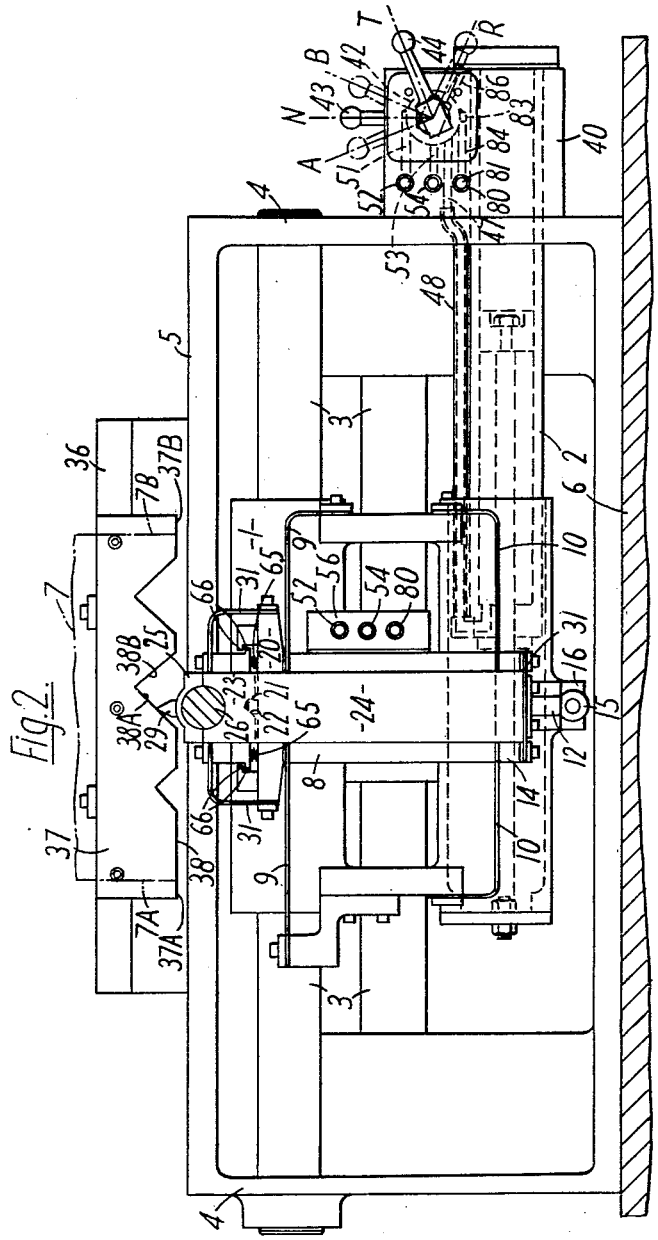
INVENTOR
JOHN GODFREY NOBLE
BY
WATSON, COLE, GRINDLE + WATSON
ATTORNEYS

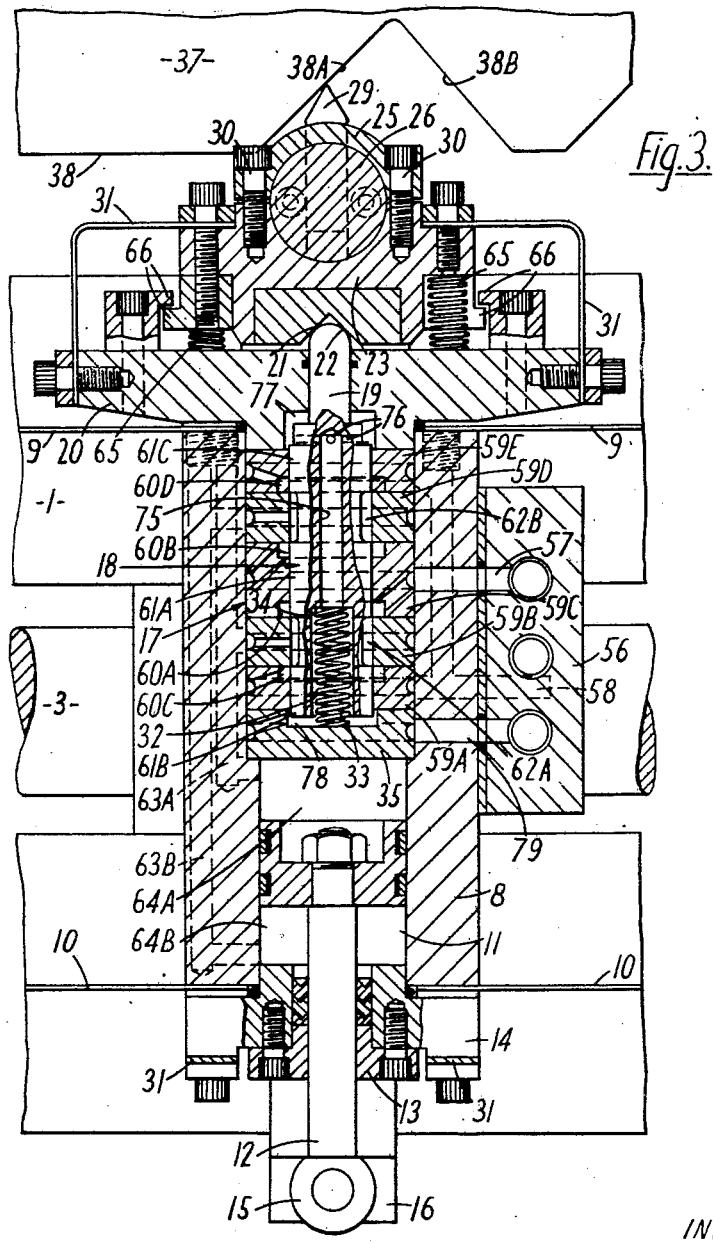

May 22, 1962 J. G. NOBLE 3,035,565
COPYING DEVICES
Filed Nov. 15, 1960 4 Sheets-Sheet 4
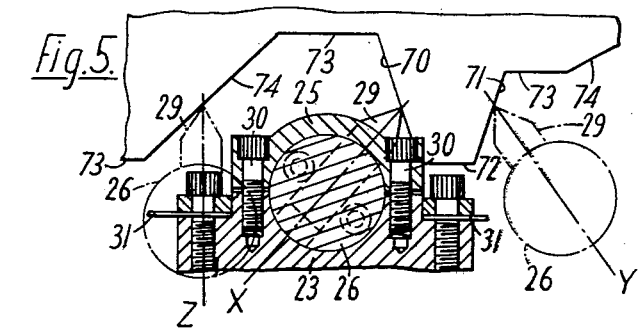
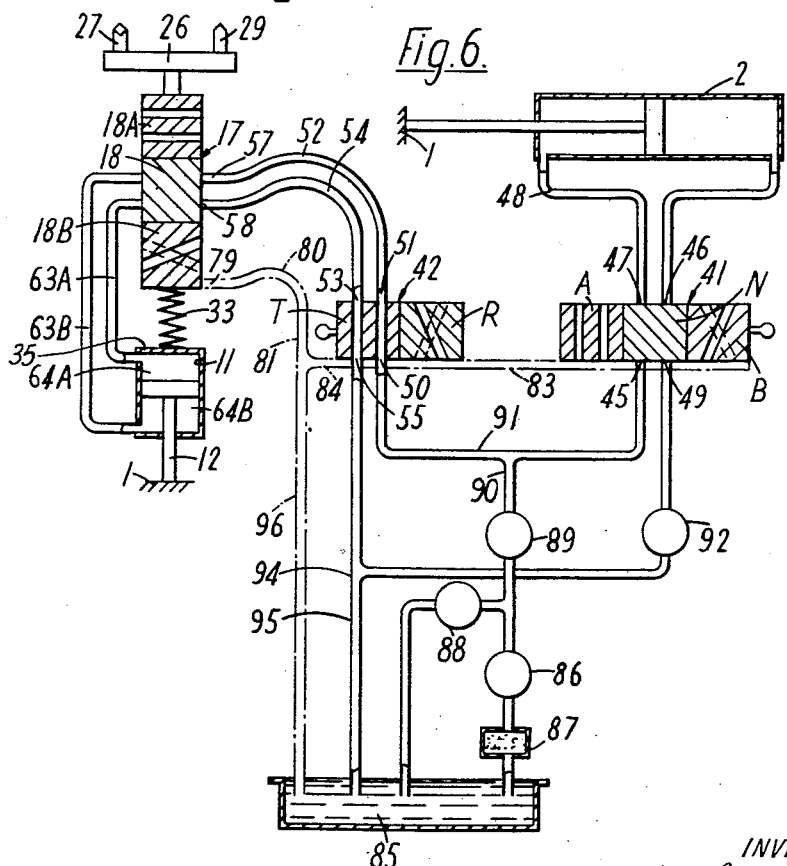
INVENTOR
JOHN GODFREY NOBLE
BY
WATSON, COLE, GRINDLE + WATSON
ATTORNEYS United States Patent Office 3,035,565
Patented May 22, 1962

3,035,565
COPYING DEVICES
John G. Noble, Sheffield, England, assignor to Snow & Company Limited, Sheffield, England
Filed Nov. 15, 1960, Ser. No. 69,463
Claims priority, application Great Britain Nov. 18, 1959
9 Claims. (Cl. 125—11)

This invention relates to copying devices of the type in which a reciprocable stylus is adapted to contact and follow the profile of a template or former (hereinafter referred to as the "template") as the stylus is traversed with respect to the template, and in which means is provided for controlling the movement of a forming tool in accordance with the movements imposed on the stylus by the profile of the template, as the tool traverses with respect to a workpiece which it is adapted to form, so that the workpiece is formed by the tool with a replica of the profile of the template, whether the profile be amplified or diminished, as between template and workpiece, or, as is more usual, reproduced as far as possible to the same scale.

One well-known form of control means consists of a hydraulic servo-valve operated in response to movement of the stylus and controlling a hydraulic cylinder, generally double-acting, for moving the tool. One disadvantage of this system is that there is always a time lag, however small, between movement of the stylus and the corresponding movement of the tool, so that it is difficult to determine the precise position of the tool at any instant, and hence difficult to reproduce accurately on the workpiece a specified dimension on the template, particularly when such a dimension is determined by opposite movement of the tool, e.g. a raised land, or a portion of increased diameter intermediate the ends of a shaft being turned by the tool.

Another well-known form of control means, devised to overcome the above disadvantage, consists of a rigid mechanical connection between the stylus and the tool, and a compression spring to urge the stylus and the tool into contact with the template and the workpiece respectively, the rigid connection ensuring that movement of the stylus produces a simultaneous movement of the tool, and in general, the stylus and tool are carried by a common mounting block so that the movement of the tool is exactly similar to the movement of the stylus. However, this system has the disadvantage that extension or contraction of the spring, as the case may be, to maintain the stylus in contact with a varying profile causes the spring load to vary and, though this has little consequence as regards the stylus, the variation in spring load may become so great as to impair the effectiveness of the tool in forming an exactly similar profile on the workpiece to that appearing on the template.

The object of the present invention is to provide a copying device having neither of the above disadvantages.

According to the present invention, a copying device comprises a stylus adapted to contact a profiled template, a forming tool adapted to contact a workpiece, a rigid mechanical connection between the stylus and the tool, means for traversing the stylus with respect to the template and the tool with respect to the workpiece, a compression spring adapted to urge the stylus into contact with the template and the tool into contact with the workpiece, a movable abutment for the spring, a hydraulic cylinder adapted to move the abutment, and a hydraulic servo-valve adapted to be operated in response to movement of the stylus with respect to the abutment and adapted to control the hydraulic cylinder for moving the abutment in a manner such that the spring load is maintained substantially constant, regardless of any variation in the profile of the template. The hydraulic cylinder is preferably double-acting in order to be equally responsive to movement of the stylus in either direction and, conveniently, a manual control valve is provided for actuation of the double-acting cylinder to withdraw the stylus from the template and, simultaneously, the tool from the workpiece, at any time, but more particularly when an end of the template profile is reached, so that the tool is not plunged into the workpiece or any part associated with the workpiece. An automatic control valve may also be provided to effect withdrawal of the stylus and the tool at any given moment, such as when an end is reached in the required profile on the workpiece, and may also be adapted to effect resetting of the stylus and tool ready for further traversing of the template on the same or a fresh workpiece respectively. Thus, stops may be provided on the template or its mounting for operative engagement with an actuating lever of a control valve also adapted to traverse with respect to the template. In general, however, it suffices for the template to extend beyond each end of the workpiece, so that the tool runs smoothly into and out of the workpiece at the required angle or angles, the extended ends of the template being effective to take the spring load when the tool is not in contact with the workpiece.

The stylus and the tool may be carried by a common mounting block providing the rigid mechanical connection, and the mounting block may consist of a cylindrical bar journalled in a supporting bracket, which is non-rotatable but connected for reciprocation with the spool of the servo-valve, and means provided for securing the bar with the stylus and tool at any angle to the direction of traverse suited to the profile being followed and formed, for example, when asymmetrical shapes appear in the profile. The compression spring may apply its load through the spool of the servo-valve, or it may be disposed between the cylinder block and the supporting bracket, in which position it is more readily accessible for replacement by a spring having a different rating when a greater or lesser loading is required. Where a considerable loading is required, more than one compression spring may be disposed between the cylinder block and the supporting bracket, the springs then conveniently being of equal rating and disposed symmetrically with respect to the common axial plane of the stylus and the tool. Outward movement of the stylus and tool is preferably limited, as by interengaging stops on the supporting bracket and the cylinder block, to an amount only slightly in excess of that required for satisfactory operation of the servo-valve, so that when the stylus is not in contact with a template free expansion of the spring or springs cannot cause damage to the servo-valve or any other part of the mechanism.

The traversing means may consist of a hydraulic cylinder preferably double-acting, and the hydraulic supply circuits to the traversing cylinder and the abutment operating cylinder may be interconnected with a throttle valve in the circuit of the traversing cylinder, so that the abutment operating cylinder has priority over the traversing cylinder, whereby the rate of movement of the stylus over the surface of the template will remain substantially constant despite any appreciable deviation of the profile from a straight line parallel to the direction of traverse and, consequently, the rate at which the tool forms the same profile on the workpiece will also remain substantially constant.

A preferred embodiment intended for the truing of profiled grinding wheels, such as are used in machines for form grinding the slideways and guideways of lathe beds, will now be described with reference to the accompanying drawings, in which:

FIGURE 2 is a front elevation of the device of FIGURE 1;

FIGURE 3 is an enlarged vertical section corresponding to part of FIGURE 2;

Figure 4:
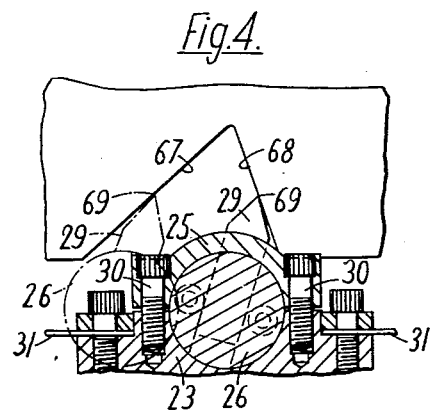

FIGURES 4 and 5 correspond to part of FIGURE 3, but show how the device is adapted for tracing asymmetrical profiles, and FIGURE 6 is a simplified diagram of the hydraulic circuits of the device.

Figure 1:
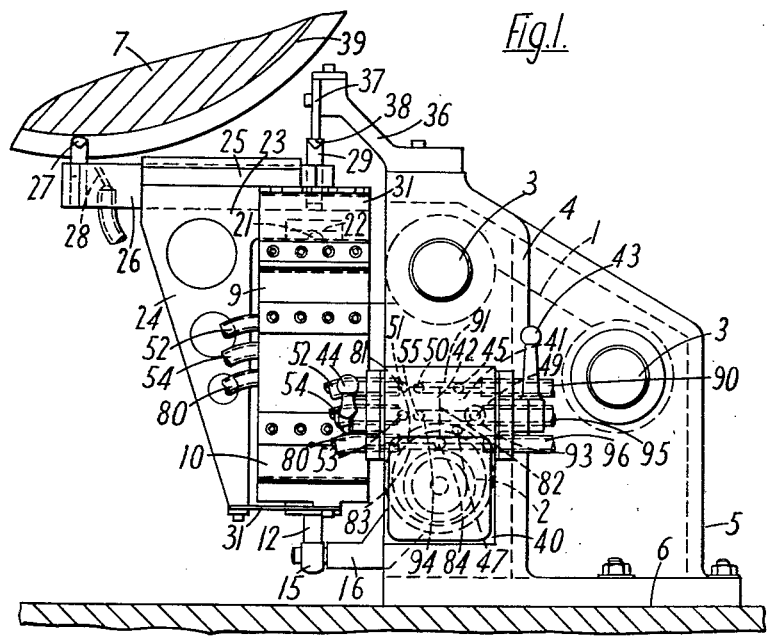
FIGURE 1 is an end elevation of the device, shown mounted across one end of a grinding machine table.

In FIGURES 1 to 3, a carriage 1 is mounted for reciprocation by means of a horizontal double-acting cylinder 2 on guides 3 extending between end plates 4 of a frame 5 adapted to be bolted across one end of a grinding machine table 6 (or any other convenient part of the machine) in a position parallel to the axis of the grinding wheel or gang of wheels 7, as the case may be (hereinafter referred to in the singular). A cylinder block 8 is mounted vertically in the carriage by means of upper and lower thin leaf springs 9, 10 respectively, which permit vertical movement of the block without rotation, and the lower portion of the block comprises a double-acting cylinder 11 with its piston rod 12 extending downwardly through a gland 13 in the lower end plate 14 to be secured by an eye 15 to a bracket 16 extending from the carriage 1, so that the cylinder block is adapted to move vertically with respect to the carriage.

The upper portion of the block 8 houses a servo-valve 17 for controlling the double-acting cylinder 11, the spool 18 of the servo-valve having a nose 19 extending through the upper end plate 20 and terminating in a hemispherical end 21 seating in a V-groove 22 in the underside of the horizontal arm 23 of an inverted L-shaped bracket 24 having a split bearing 25 at right angles to the wheel axis for a cylindrical bar 26 carrying a diamond-tipped tool 27 (with a coolant passage 28) and a stylus 29 beyond the opposite ends of the bearing. The split bearing is clamped onto the bar by set-screws 30, to enable the bar 26 to be secured with the tool 27 and stylus 29 extending at any desired angle to the bracket 24 (see also FIGURES 4 and 5) which is restrained against rotation relative to the cylinder block 8 by means of further thin leaf springs 31.

The lower end of the spool 18 has a blind bore 32 to house a spring 33 which is compressed between the blind end 34 of the bore and an abutment plate 35 fixed in the block 8 to separate the servo-valve 17 from the double-acting cylinder 11.

The frame also carries a mounting bracket 36 for a vertical template 37 extending parallel to the direction of traverse and having its lower edge 38 profiled in accordance with the desired profile of the grinding wheel 7. The template is mounted at such a height that the stylus 29 may contact the profiled edge 38 at a point corresponding to the point at which the diamond of the tool 27 contacts the periphery 39 of the grinding wheel as the axis of the latter is brought to the required spacing from the template.

A valve block 40 is mounted at one end of the frame 5 and forms a head for the outer end of the cylinder 2. The valve block houses two rotary spool valves 41, 42 of convention design, mounted end-to-end so that their respective control levers 43, 44 are well separated yet equally accessible from the side of the table 6. The lever 43 is movable from a neutral position N to either of two positions A, B determining the direction of traverse by connecting a pressure supply port 45 through a port in the spool 41 either to a port 46 communicating with the outer end of the cylinder 2 (for inward traverse of the carriage 1), or to a port 47 and a pipe 48 communicating with the inner end of the cylinder (for outward traverse), while another port in the spool 41 connects whichever end of the cylinder may be exhausting to a port 49. The lever 44 is movable between two positions T, R for setting the stylus and tool for tracing or for retracting them, by connecting a pressure supply port 50 through a port in the spool 42 either to a port 51 communicating by a flexible pipe 52 with the servo-valve 17, or to a port 53 also communicating with the servo-valve by another flexible pipe 54, while another port in the spool 42 connects whichever of the pipes may be exhausting to a port 55. The ports in the spools 41, 42 have been omitted for the sake of clarity but should be understood as being of the usual diametral-bore and/or peripheral groove type disposed as required to make the necessary connections.

The flexible pipes 52, 54 lead from the valve block 40 to a connecting block 56 on the cylinder block 8, from which ports 57, 58 (FIGURE 3) communicate with the servo-valve 17. The cylinder of the servo-valve is built up within the cylinder block 8, between the abutment plate 35 and the upper end plate 20, from a series of washers 59A, 59B, 59C, 59D, 59E, with ring ports 60A, 60B in the washer 59C communicating with the port 57, and further ring ports 60C, 60D in the washers 59A, 59E respectively communicating with the port 58. In the neutral position of the servo-valve, i.e., as shown in FIGURE 3, the ports 60A, 60B are just closed by a land 61A on the spool 18 from communication respectively with annular spaces 62A, 62B between the land 61A and further lands 61B, 61C respectively, the latter also just closing off the ring ports 60C, 60D from communication with the annular spaces 62A, 62B respectively.

The annular space 62A communicates permanently with a passage 63A in the wall of the cylinder block 8 leading to the upper end 64A of the cylinder 11 so that when, during tracing (i.e., with the lever 44 in the position T), the stylus 29 is following a receding incline 38A on the template, as determined by outward movement of the carriage 1 (i.e., with the lever 43 in the position B), and expansion of the spring 33 causes the spool 18 to follow up the outward movement of the stylus, the ring port 60A is opened to the annular space 62A, whereby pressure fluid from the port 57 passes to the passage 63A and is admitted to the upper end of the cylinder 11 and hence the cylinder block 8 and abutment plate 35 are raised until the spool 18 is again in neutral position and the spring 33 is restored to its original compressed length. Thus the load applied by the spring to the tool 27 and stylus 29 remains virtually constant, regardless of upward movement of the stylus from the lowest part of the profile 38. The annular space 62B communicates permanently with a passage 63B in the wall of the cylinder block 8 leading to the lower end 64B of the cylinder 11 so that when the annular space 62A is open to the port 57, opening of the annular space 62B to the port 58 via the ring port 60D permits the lower end of the cylinder 11 to exhaust to the flexible pipe 54.

With a maintained incline, the cylinder 8 does not catch up with the spool 18, but follows up so closely that the ring ports 60A, 60D are just "cracking-open" and the spring 33 is not appreciably expanded.

Similarly, when the stylus 29 is following an advancing incline 38B on the template and the spool 18 is depressed, the ring port 60B is opened to the annular space 62B, whereby pressure fluid from the port 57 passes to the passage 63B and is admitted to the lower end 64B of the cylinder 11, and hence the cylinder block 8 and abutment plate 35 are lowered until the spool 18 is again in neutral position and the spring 33, which had been additionally compressed, is restored to its original compressed length. When the annular space 62B is open to the port 57, opening of the annular space 62A to the port 58 via the ring port 60C permits the upper end 64A of the cylinder 11 to exhaust to the flexible pipe 54.

The template 37 extends beyond each end 7A, 7B (FIGURE 2) of the wheel 7, so that the tool 27 runs smoothly into and out of the wheel surface parallel to the axis, the extended ends 37A, 37B of the template profile 38 being effective to resist upward movement of the stylus 29 until the tool is well clear of either of the ends of the wheel. Thus, when the tool has left the end 7B of the wheel, the spool valve 42 may be set for retraction of the cylinder block 8, by moving the lever 44 to the position R so that the pressure supply port 50 is connected to the port 53, leading via the flexible pipe 54 to the port 58, and the exhaust port 55 is connected to the port 51, leading via the flexible pipe 52 to the port 57. When the stylus clears the end 37B of the template, the ring port 60D (FIGURE 3) is opened to the annular space 62B for pressure fluid from the port 58 to pass to and through the passage 63B to the lower end 64B of the cylinder 11, so that the block 8 (and with it the stylus 29 and tool 27) is lowered. By reverse traverse, i.e., with the lever 43 moved to the position A, the stylus and tool may be held retracted until the stylus is below the portion 37A of the template 37 when they may be re-set for tracing by returning the lever 44 to the position T. Alternatively, the stylus and tool may be re-set for tracing when during reverse traverse the stylus is below the extended end 37B of the template.

The major portion of the load on the stylus and tool is applied by two (or more) springs 65 of equal rating disposed symmetrically with respect to the common axial plane of the stylus and the tool, between the upper end plate 20 of the cylinder block 8 and the horizontal arm 23 of the supporting bracket 24. The springs 65 thus act in parallel with the spring 33, so that the latter may be of low rating and virtually only effective to maintain contact of the hemispherical end 21 of the nose 19 of the spool 18 with the groove 22 in the underside of the arm 23. The springs 65 are also readily accessible for replacement by springs of a different rating in accordance with a greater or lesser spring loading as may be required. Outward (i.e., upward) movement of the stylus 29 and tool 27 is limited by interengaging stops 66 to an amount only slightly in excess of that required for satisfactory operation of the servo-valve 17, so that when the stylus is not in contact with the template, as in the circumstances previously mentioned, free expansion of the springs 65 cannot cause damage to the servo-valve or any other part of the mechanism.

Slight lateral clearance at the stops 66 ensures that the mechanism does not bind when the change over from the receding incline 38A to the advancing incline 38B imposes a lateral thrust on the stylus 29, and any lateral movement of the supporting bracket 24 (resulting from such a thrust) is translated by the V-groove 22 into a downward movement of the spool 18 for operation of the servo-valve to be promptly initiated in the appropriate manner.

When asymmetrical shapes or steep inclines appear in the profile of the template, the stylus and tool may be set at the most suitable angle by slackening the set-screws 30 to loosen the split bearing 25, rotating the bar 26 to the required angle, and then tightening up the set-screws so that the split bearing clamps the bar against accidental rotation. In FIGURE 4, the angles of the asymmetrical inclines 67, 68 are such that a single angular setting of the stylus is sufficient for the point 69 of the stylus to follow both inclines, while in FIGURE 5, the opposed inclines 70, 71 (whether symmetrical or asymmetrical) are of such angles as to prevent a single angular setting serving for both inclines, so that an angular setting X is required for the incline 70 and a different angular setting Y is required for the incline 71; either setting is suitable for the connecting portion 72 of the profile. Although it is then necessary to change the angular setting during traversing of the profile, more particularly while traversing the portion 72, the common mounting of the stylus and tool in the bar 26 ensures that when the stylus continues its traverse (preferably with a slight overlap), the tool continues smoothly from that portion of the wheel periphery which has been profiled to that portion that has not been profiled, so that there is no step or interruption in the completed profiled periphery of the wheel. Either of the settings X, Y may be used, where suitable, for other portions of the profile, but where numerous horizontal portions 73 or inclines 74 of lesser angle than the inclines 70, 71 appear in the profile, a further angular setting or a return to the vertical setting (indicated at Z) may be preferable.

Referring again to FIGURES 1 to 3, the spool 18 has an axial passage 75 extending inwardly from the bore 32 and communicating through radial bores 76 with a chamber 77 provided at the upper end of the servo-valve to accommodate upward movement of the spool. A similar chamber 78 at the lower end of the servo-valve is provided by a recess in the abutment plate 35 to accommodate downward movement of the spool, and this chamber communicates with a port 79, in the connecting block 56 connected in turn by a flexible pipe 80 to a port 81 passing straight through the valve block 40. Any pressure fluid seeping between the land 61C and the washer 59E is thus drained through the bores 76, passage 75 and bore 32 into the chamber 78 from whence it drains, along with any pressure fluid seeping between the land 61B and the washer 59A, to the port 79 and through the flexible pipe 80 to the port 81. Likewise, any pressure fluid seeping between the rotary spools 41, 42 and the valve block 40, either to the interface 82 or the opposed ends of the spools, drains into a gutter 83 in the block 40 and through a port 84 to the port 81.

In FIGURE 6, the hydraulic circuits of both the "tracer control" (i.e., the servo-valve 17 and the double-acting cylinder 11) and the traversing cylinder 2 are shown diagrammatically in relation to each other, together with the pressure fluid supply, return (or exhaust) and drains. The rotary spool valves 41, 42 are represented as simple slide valves providing direct and crossed connections for the appropriate ports in accordance with the previous description. Thus the valve 41 is shown with portions A and B affording port connections in accordance with the corresponding positions of the lever 43, while the valve 42 is shown with portions T and R in accordance with the corresponding positions of the lever 44. Similarly, the spool 18 of the servo-valve is simplified and shown with portions 18A and 18B affording port connections in accordance with the corresponding displacement of the stylus 29.

Referring to FIGURE 6 in conjunction with FIGURE 1, it will be seen that fluid from a reservoir 85 is drawn by a pump 86 through a strainer 87 and delivered at a constant pressure (which is determined by a relief valve 88) to a throttle valve 89, which in turn delivers to a pipe 90 leading to a common port 91 in the valve block 40 communicating with the ports 45, 50. A pressure relief valve 92, conveniently a spring-loaded ball check valve housed in a counterbore 93 in the port 49 of the spool valve 41, checks the exhaust from the cylinder 2 before it reaches a common exhaust port 94 for the ports 49, 55 leading by a pipe 95 to the reservoir 85. A further pipe 96 leads from the drain port 81 in the valve block 40 to the reservoir.

The common supply port 91 provides an inter-connection between the traversing cylinder 1 and the tracer control, and the relief valve 92 causes back pressure to be built up in the exhaust line from the traversing cylinder, so that the tracer control always has priority over the traversing cylinder. Thus, when the stylus 29 is following an incline on the template, the demand of the tracer control reduces the supply to the traversing cylinder, thereby reducing the rate of traverse so that the rate of movement of the stylus over the profiled surface of the template and, likewise, the rate of movement of the diamond over the surface of the wheel is maintained substantially constant.

The build up of back pressure caused by the relief valve 92 also ensures that the supply to the traversing cylinder is not throttled when it is reduced by the increased demand of the tracer control.

What I claim is:

1. A copying device comprising a profiled template, a stylus for contacting the template, a tool for forming a workpiece, a rigid mechanical connection between the stylus and the tool, means for traversing the stylus with respect to the template and the tool with respect to the workpiece, a compression spring for urging the stylus into contact with the template and the tool into contact with the workpiece, a movable abutment for the spring, a hydraulic piston and cylinder for moving the abutment, and a hydraulic servo-valve operable in response to movement of the stylus with respect to the abutment to control the hydraulic piston and cylinder for moving the abutment in a manner such that the spring load is maintained substantially constant, regardless of any variation in the profile of the template.

2. A copying device comprising a profiled template, a stylus for contacting the template, a tool for forming a workpiece, a rigid mechanical connection between the stylus and the tool, means for traversing the stylus with respect to the template and the tool with respect to the workpiece, a compression spring for urging the stylus into contact with the template and the tool into contact with the workpiece, a movable abutment for the spring, a double-acting hydraulic piston and cylinder for moving the abutment, and a hydraulic servo-valve operable in response to movement of the stylus with respect to the abutment to control the hydraulic piston and cylinder for moving the abutment in a manner such that the spring load is maintained substantially constant, regardless of any variation in the profile of the template.

3. A copying device comprising a profiled template, a stylus for contacting the template, a tool forming a workpiece, a rigid mechanical connection between the stylus and the tool, means for traversing the stylus with respect to the template and the tool with respect to the workpiece, a compression spring for urging the stylus into contact with the template and the tool into contact with the workpiece, a movable abutment for the spring, a double-acting hydraulic piston and cylinder for moving the abutment, a hydraulic servo-valve operable in response to movement of the stylus with respect to the abutment to control the hydraulic piston and cylinder for moving the abutment in a manner such that the spring load is maintained substantially constant, regardless of any variation in the profile of the template, and a manual control valve for actuation of the double-acting piston and cylinder to withdraw the stylus from the template and the tool from the workpiece.

4. A copying device as in claim 3, wherein the profiled template extends beyond each end of the workpiece.

5. A copying device comprising a profiled template, a stylus for contacting the template, a tool for forming a workpiece, a cylindrical bar for carrying both the stylus and the tool, a supporting bracket in which the cylindrical bar is journalled, means for traversing the supporting bracket with respect to the template and the workpiece, means for securing the cylindrical bar in the supporting bracket with the stylus and tool at any angle to the direction of traverse, a compression spring for urging the stylus into contact with the template and the tool into contact with the workpiece, a movable abutment for the spring, a double-acting hydraulic piston and cylinder for moving the abutment, and a hydraulic servo-valve with its spool connected to the supporting bracket to control the hydraulic piston and cylinder for moving the abutment in a manner such that the spring load is maintained substantially constant, regardless of any variation in the profile of the template.

6. A copying device as in claim 5, wherein the axis of the hydraulic servo-valve intersects the abutment for the compression spring, the other end of which abuts the adjacent end of the spool of the servo-valve.

7. A copying device comprising a profiled template, a stylus for contacting the template, a tool for forming a workpiece, a cylindrical bar for carrying both the stylus and the tool, a supporting bracket in which the cylindrical bar is journalled, means for traversing the supporting bracket with respect to the template and the workpiece, means for securing the cylindrical bar in the supporting bracket with the stylus and tool at any angle to the direction of traverse, compression springs abutting the supporting bracket for urging the stylus into contact with the template and the tool into contact with the workpiece, the springs being of equal rating and disposed symmetrically with respect to the common axial plane of the stylus and the tool, an abutment for the other ends of the compression springs, a double-acting hydraulic piston and cylinder for moving the abutment, and a hydraulic servo-valve with its spool connected to the supporting bracket to control the hydraulic piston and cylinder for moving the abutment in a manner such that the spring load is maintained substantially constant, regardless of any variation in the profile of the template.

8. A copying device as in claim 7, provided with interengaging stops on the supporting bracket and the abutment for the other ends of the compression springs, to limit outward movement of the stylus and the tool.

9. A copying device comprising a profiled template, a stylus for contacting the template, a tool for forming a workpiece, a cylindrical bar for carrying both the stylus and the tool, a supporting bracket in which the cylindrical bar is journalled, a frame for carrying the template, guides on the frame extending parallel to the general direction of the template, a carriage slidable on the guides, with the supporting bracket mounted on the carriage for reciprocation towards and away from the template, a double-acting hydraulic piston and cylinder for traversing the carriage along the guides, means for securing the cylindrical bar in the supporting bracket with the stylus and tool at any angle to the direction of traverse, compression springs abutting the supporting bracket for urging the stylus into contact with the template and the tool into contact with the workpiece, the springs being of equal rating and disposed symmetrically with respect to the common axial plane of the stylus and the tool, an abutment for the other ends of the compression springs, a double-acting hydraulic piston and cylinder for moving the abutment, and a hydraulic servo-valve with its spool connected to the supporting bracket to control the hydraulic piston and cylinder for moving the abutment in a manner such that the spring load is maintained substantially constant, regardless of any variation in the profile of the template.

References Cited in the file of this patent
UNITED STATES PATENTS 2,187,690   Martin _____ Jan. 16, 1940